United States Patent [19]

Melinat

[11] 4,445,335
[45] May 1, 1984

[54] MASTER CYLINDER ASSEMBLY

[75] Inventor: Wolfgang Melinat, Dayton, Ohio

[73] Assignee: General Motors Corporation, Detroit, Mich.

[21] Appl. No.: 279,742

[22] Filed: Jul. 2, 1981

[51] Int. Cl.³ .......................................... B60T 11/28
[52] U.S. Cl. .................................................... 60/589
[58] Field of Search ................. 60/585, 589; 251/63.4, 251/229, 263

[56] References Cited

U.S. PATENT DOCUMENTS

| | | | |
|---|---|---|---|
| 2,000,187 | 5/1935 | Oliver | 60/589 |
| 2,657,537 | 11/1953 | Oakley | 60/589 |
| 3,338,550 | 8/1967 | Coulter | 251/263 |
| 3,344,802 | 10/1967 | McGeachy | 251/263 |
| 3,390,921 | 7/1968 | Klimek | 251/263 |
| 4,017,053 | 4/1977 | Wells | 251/63.4 |
| 4,043,353 | 8/1977 | Shirey | 251/229 |
| 4,050,670 | 9/1977 | Borg | 251/229 |

Primary Examiner—Abraham Hershkovitz
Attorney, Agent, or Firm—D. D. McGraw

[57] ABSTRACT

A short master cylinder assembly having a transversely disposed compensation and bypass port controlled by a check valve. The check valve is cammed to the open position by a pressurizing piston, and is closed by spring action upon movement of the pressurizing piston in the pressure actuating direction.

1 Claim, 3 Drawing Figures

MASTER CYLINDER ASSEMBLY

The invention relates to a master cylinder assembly which has a short axial length. The short overall length of the master cylinder housing is obtained by using short single-sealed primary and secondary pistons which are interconnected with a lost motion mechanism. The master cylinder compensating and bypass functions are controlled by devices which open and close valves placed in transverse passages connecting the pressurizing chambers with their respective brake fluid reservoir chambers. In the embodiment herein disclosed, the primary pressurizing chamber compensating and bypass function is controlled by a valve operating mechanism responsive to the axial position of the secondary pressurizing piston in the master cylinder bore. The secondary pressurizing chamber compensating and bypass function may be controlled by a power device such as a solenoid, which may be of the type more particularly disclosed and claimed in application Ser. No. 279,743 filed on even date herewith by the same inventor and assigned to the same assignee.

The ports, passages and valves accomplishing compensating and bypass functions are positioned in master cylinder housing sections formed transversely of the master cylinder bore section so that only one port need be provided in each pressurizing chamber, requiring a minimal axial length to accommodate these functions. The controls for these functions are positioned on the side of the bore section so that they do not contribute any additional required axial length of the bore section. The transverse sections of the master cylinder housing also provide mounting bosses for the multiple chambered brake fluid reservoir attached to and mounted above the master cylinder housing. The preferred arrangement illustrated uses a normally closed check valve in the fluid connection between the reservoir and the primary pressurizing chamber. The check valve prevents flow from the pressurizing chamber to the reservoir when closed. A spring loaded and cam actuated valve actuating mechanism opens the valve and holds it open so long as the secondary pressurizing piston is positioned in the master cylinder released position illustrated in FIG. 1. When the master cylinder is actuated and the secondary pressurizing piston is moved in an actuating direction, the valve actuating mechanism will permit the check valve to be closed to seal the primary pressurizing chamber relative to the reservoir chamber so that fluid pressurization can begin with minimal brake pedal movement.

IN THE DRAWING

Figure 1:
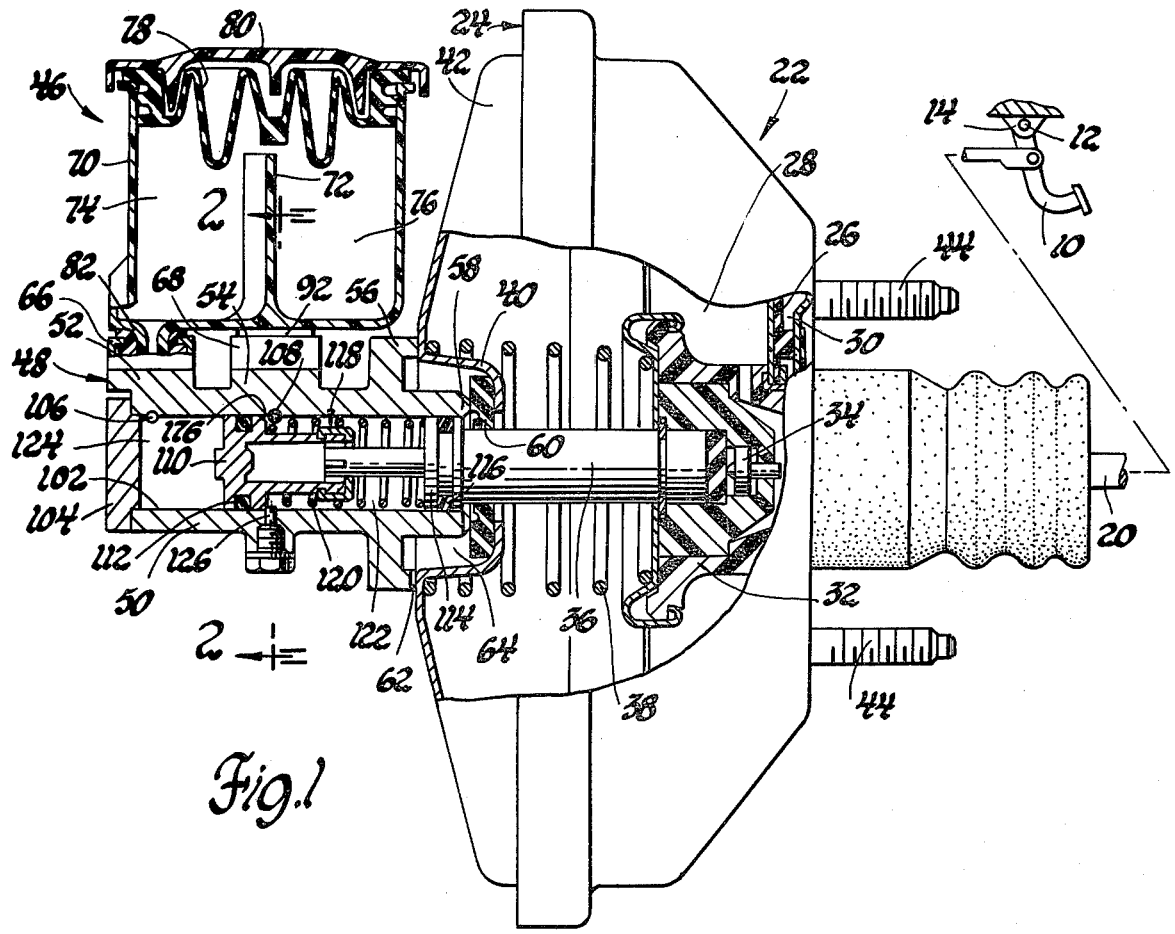
FIG. 1 is an elevation view of a portion of a vehicle brake system including a brake pedal, a brake power booster, and a master cylinder assembly, with parts broken away and in section.

The vehicle brake system is illustrated as including a brake pedal 10 pivotally mounted at 12 on a suitable fixed portion 14 of the vehicle in which the system is installed. The brake pedal is connected to move a push rod 20 for actuation of the valve mechanism of the power brake booster assembly 22. Although details of the valve mechanism are not illustrated and are not pertinent to the invention, it is recognized that a suitable valve arrangement such as that commonly used on power brake boosters is provided. The booster assembly 22 is illustrated as being a vacuum suspended power brake booster having a housing 24 divided by a power wall 26 into a vacuum chamber 28 and a variable pressure chamber 30. The power wall 26 includes a booster piston assembly 32 which may contain the booster control valve mechanism and a suitable reaction device 34, and which is connected to a booster output member 36. A booster power wall return spring 38 is positioned in chamber 28 with one end acting against the piston assembly 32 and the other end fitting over an inwardly disposed crown section 40 of the forward wall 42 of booster housing 24 so that the forward spring end reacts against forward wall 42 and is held in place by the extension of crown section 40 into the spring. The booster housing 24 is provided with a mounting arrangement such as mounting bolts 44 for mounting the booster assembly in the vehicle engine compartment on the forward side of the fire wall. A suitable vacuum supply, not shown, is connected to chamber 28 to maintain the booster in vacuum suspended condition.

The master cylinder assembly 46 includes a housing 48 provided with an axially extending bore section 50 and a pair of axially spaced transverse sections 52 and 54 positioned on the upper side of the bore section. The bore section also has a mounting flange 56 adjacent the rear end 58 so arranged that the rear end 58 extends into the recess defined by crown 40, engaging and retaining a booster seal 60 while the flange 56 engages the forward surface of booster forward wall 42 radially outward of the crown 40, and is suitably attached to the booster. This arrangement also contributes to reduced overall length of the entire booster and master cylinder assembly. The bottom portion of flange 56 is provided with a vent 62 so that the chamber 64 within crown section 40 is vented to atmosphere.

Transverse sections 52 and 54 have mounting bosses 66 and 68 on the upper portions thereof which provide for the mounting of the reservoir body 70. The reservoir body may be made of a suitable plastic material such as reinforced nylon. It has a divider wall 72 formed therein dividing the reservoir into chambers 74 and 76. A diaphragm seal 78 and reservoir cover 80 seal the chambers 74 and 76. The bottom of reservoir 70 is provided with a pair of spigots 82 and 84, one of which is better illustrated in FIG. 2. As shown in that Figure, spigot 84 extends downwardly from the bottom 86 of the reservoir 70 and has a port or passage 88 formed therethrough. The lower end of spigot 84 has a flange 90 which cooperates with a retaining seal 92 and a mounting boss flange 94 to secure the reservoir 70 in place on the housing 48. Mounting boss 68 has an enlarged passage section 96 into which the port 84 opens. A port or passage 98 connects pasially therethrough, the forward end of which is closed by a bore plug 104. The rear end of bore 102 opens through the master cylinder housing section rear end 58. Compensation and bypass ports 106 and 108 extend transversely of the bore 102 so that they respectively intersect the bore, as better shown in FIG. 2, in axially spaced relation. They take up a minimal amount of axial space, so the axial length of bore 102 need not be extended for their accommodation. A secondary pressurizing piston 110 is reciprocably received in the forward portion of bore 102 and has a single piston seal 112. A primary pressurizing piston 114 is received in the rear portion of bore 102 and also has a single seal 116. Pistons 110 and 114 are connected by a suitable interconnecting lost motion mechanism 118 which permits relative closing movements of the pistons but limits the amount of separation that the pistons may obtain to a predetermined distance so that the pistons are separated by this amount while the master cylinder is at rest and in the released position illustrated in FIG. 1. A primary pressurizing piston return spring 120 is contained in the primary pressurizing chamber 122 defined by pistons 110 and 114 and extends circumferentially about the mechanism 118. The compressive force of spring 120 continually urges pistons 110 and 114 axially apart toward the separation limit established by mechanism 118. A secondary pressurizing chamber 124 is defined forwardly of piston 110 between that piston and bore plug 104. The arrangement is such that secondary piston 110, in the rest position, remains clear of port 108 and that port is always connected to chamber 122. A secondary piston stop 126 assures this precise position. Port 106 is located adjacent and immediately to the rear of bore plug 104 so that it is always in open communication with secondary pressurizing chamber 124. The brake booster output member 36 is a unitary part of the primary pressurizing piston 114 and is arranged to be reciprocably sealed by booster seal 60.

Figure 2:
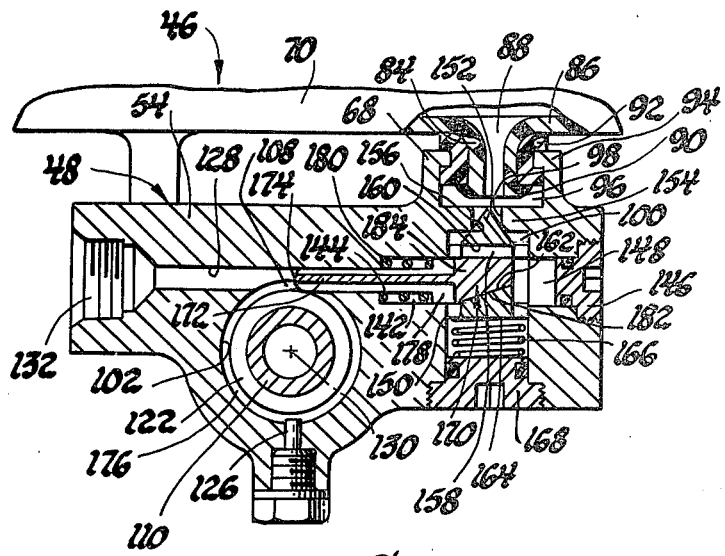
FIG. 2 is a cross section view taken in the direction of arrows 2—2 of FIG. 1, having parts broken away and in section.
Figure 3:
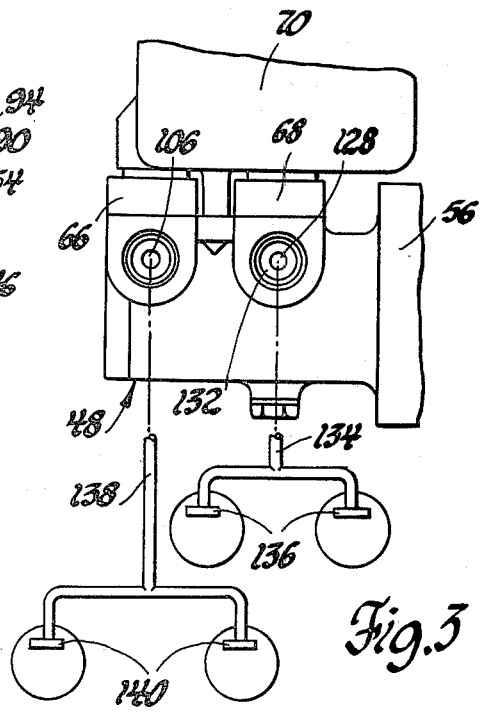
FIG. 3 is another elevation view of the portion of the vehicle brake system of FIG. 1, having parts broken away and schematically illustrating portions of the vehicle brake system.

Transverse sections 52 and 54 are similarly constructed and therefore only transverse section 54, illustrated in FIG. 2, will be further described. Transverse section 54 includes a passage 128 extending perpendicularly skew to the axis 130 of bore 102 so that it tangentially intersects the bore to provide port 108. The end 132 of passage 128, as seen in FIG. 2, extends outwardly of the transverse section 54 and is connected to a brake line 134 of one brake circuit of the vehicle. Brake line 134 is schematically illustrated as being connected to a set of vehicle wheel brakes 136. The other brake line 138 connected to port 106, is connected to another set of brakes 140. The brake circuit being served by brake lines 134 and 136 may lead to either of the vehicle front and rear brakes. While illustrated as a front and rear split system, other split arrangements may be used.

Passage 128 has an enlarged section 142 defined in part by shoulder 144, and extends to intersect valve chamber 100. A plug 146 seals the end 148 of passage 128 opposite passage end 132. A valve body 150 is reciprocably received in valve chamber 100 for movement axially in that chamber and therefore perpendicularly to the axis of passage 128. The valve body 150 includes a valve head 152 which extends into the opening 98 formed in flange 154. Valve head 152 cooperates with the edge of opening 98, which opens into valve chamber 100 and defines a valve seat 156 to define a check valve. The valve body 150 has a cross passage 158 formed therethrough in alignment with enlarged section 142 of passage 128. Passage 158 has its upper surface 160 positioned below valve head 152 and extending transversely of the valve body. The passage lower surface is formed to provide a cam ramp 162. The cam ramp extends upwardly from the side toward the bore 102 so that the open end of passage 158 facing generally toward bore 102 is larger than the other passage opening facing generally toward plug 146. The bottom end 164 of the valve body 150 provides a seat engaged by a valve body spring 166. Spring 166 is also seated on plug 168, which plugs the lower end of valve chamber 100. Thus spring 166 continually urges the valve body upwardly toward engagement of valve head 152 with its cooperating valve seat 156. Valve body 150 is fluted on its side to provide for fluid passage within chamber 100 whenever the valve head 152 is disengaged from the valve seat 156.

A valve control member 170 is positioned in passage 128 and extends from the area of port 108 toward plug 146. Member 170 has a fluted stem 172 provided with a stem end 174 defining a cam follower engageable by the cam-like rear surface 176 of secondary piston 110. Thus stem end 174 extends into the primary pressurizing chamber 122 through port 108. Stem 172 extends into the passage enlarged section 142 and has a radially enlarged end 178 formed thereon as a land against which spring 180 acts. Spring 180 is contained within passage section 142 and also reacts on shoulder 144 to continually urge valve control member 170 toward plug 146. The enlarged end 178 of valve control member 170 has a cam 182 formed thereon in matching relation with cam ramp 162 and extending into passage 158 so that it is in camming relation with cam ramp 162. The cam portion 184 of member 170, on which cam 182 is formed, is sufficiently spaced from stem end 174 so as to assure fluid passage to and from chamber 122 through the flutes of the fluted stem 172 and into the valve chamber 100. The effective force acting on valve control member 170 exerted by spring 180 is less than the effective force that may be exerted in the opposite direction on valve control member 170 by spring 166 acting through cam ramp 162 and cam 182. Thus, unless secondary piston 110 has engaged stem end 174 and cammed valve control member 170 toward plug 146, forcing the valve body 150 downwardly against its spring 166 to open valve seat 156 by action through cam 182 and cam ramp 162, spring 166 will move valve body 150 upwardly and exert force on valve control member 170 through the cam ramp 162 and cam 182 to move the valve control member against the force of spring 180 so that the stem end 174 is positioned within chamber 122 sufficiently to be engaged by the secondary piston cam 176 when that piston is returned to the released position.

When the master cylinder is in the released position illustrated in FIG. 1, secondary piston cam 176 holds valve control member 170 rightwardly to force the valve body 150 downwardly and hold valve seat 156 open, thereby establishing fluid communication between the reservoir chamber 76 and the primary pressurizing chamber 122. When the master cylinder is actuated, the secondary piston is moved away from engagement with stem end 174. Spring 166 moves valve body 150 upwardly so that valve head 152 seats on valve seat 156 to close opening 98 and therefore prevent fluid communication between chamber 122 and reservoir chamber 76. The upward movement of valve body 150 acts through cam ramp 162 and cam 182 to move the valve control member leftwardly to the position shown in FIG. 2, in which stem end 174 extends into chamber 122 and is positioned for engagement with secondary pressurizing piston 110 upon brake release.

The check valves controlling the functions of ports 106 and 108 remain closed during master cylinder actuation as pressure is applied. They are opened when the master cylinder is in the released position, providing fluid communication from the primary and secondary pressurizing chambers into the reservoir chambers for release of the residual brake fluid pressures in the pressurizing chambers. During brake release, small amounts of brake fluid may be drawn by negative pressure increments from the reservoir chambers into the pressurizing chambers around each of the check valves which control ports 106 and 108. In the case of the mechanism illustrated in FIG. 2, such negative pressure increments must be sufficient to overcome valve spring 166, but need not have any particular force effect directly on valve control member 170. Of course, as valve body 150 is moved downwardly by such negative pressure increment, valve control member 170 will move rightwardly under influence of its spring 180, cam 182 tending to follow cam ramp 162.

The mechanism embodying the invention provides for a very short master cylinder, and control of the compensating and bypass functions with minimal master cylinder pressurizing piston stroke loss.

The embodiments of the invention in which an exclusive property or privilege is claimed are defined as follows:

1. In a master cylinder assembly:
   a housing having a bore formed therein;
   a pressurizing piston in said bore defining therewith a fluid pressurizing chamber, said piston movable between an active position to pressurize said chamber and an inactive position when said chamber is not pressurized, said master cylinder assembly having the characteristic of compactness along the axis of said bore;
   a fluid reservoir in communication with said housing;
   said housing also having a valve chamber formed therein, a first port connecting said reservoir and said valve chamber, a passage extending transversely skew to the axis of said bore to facilitate said characteristic of compactness and intersecting said pressurizing chamber;
   said passage having one end defining a second port opening into said valve chamber and having another end defining a third port adapted to be connected to a pressurizable fluid circuit;
   a valve in said valve chamber cooperating with said first port and having first means continuously urging said valve toward engagement with said first port to close said first port, and a cam ramp on said valve engageable for moving said valve;
   a valve control member in said valve chamber having a cam thereon engaging said cam ramp and having a stem extending axially through said second port and into said passage where said passage intersects said pressurizing chamber so that one stem end is positioned in said pressurizing chamber to be cammingly engageable by said piston, said stem configured to permit fluid flow through said passage and second port, and second means acting on said valve control member and continuously urging said cam into engagement with said cam ramp;
   said piston acting in a camming manner when moving to said inactive position to cause said valve control member to move against said cam ramp and act to move said valve out of closing engagement with said first port, opening a fluid path between said reservoir and said pressurizing chamber;
   said piston acting when moving to said active position to disengage said valve control member and permit said first means to move said valve to close said first port and to move said valve control member against the force of said second means to reposition said valve control member for valve opening actuation when said piston again moves to said inactive position.

* * * * *

UNITED STATES PATENT AND TRADEMARK OFFICE
CERTIFICATE OF CORRECTION

PATENT NO. : 4,445,335
DATED : May 1, 1984
INVENTOR(S) : Wolfgang Melinat

It is certified that error appears in the above—identified patent and that said Letters Patent is hereby corrected as shown below:

Column 2, line 59, delete "pasially" and insert -- passage section 96 with a valve chamber 100 provided within transverse section 54 to be further described. The same arrangement is provided with spigot 82, mounting boss 66 and transverse section 52.

Bore section 50 has a bore 102 extending axially --.

Signed and Sealed this

Fifth Day of March 1985

[SEAL]

Attest:

DONALD J. QUIGG

Attesting Officer     Acting Commissioner of Patents and Trademarks